United States Patent [19]
Paddock et al.

[11] Patent Number: 5,752,112
[45] Date of Patent: May 12, 1998

[54] MOUNTING SYSTEM FOR BODY MOUNTED CAMERA EQUIPMENT

[75] Inventors: George K. Paddock; Christopher C. Haarhoff, both of Los Angeles; Mark D. O'Kane, Manhattan Beach, all of Calif.

[73] Assignee: George Paddock, Inc., Mesa, Ariz.

[21] Appl. No.: 746,204

[22] Filed: Nov. 6, 1996

[51] Int. Cl.⁶ .................... G03B 17/00; G03B 21/00
[52] U.S. Cl. .................... 396/421; 396/422; 352/243
[58] Field of Search .................. 396/419, 420, 396/421, 422, 428; 352/243

[56] References Cited

U.S. PATENT DOCUMENTS

| | | | |
|---|---|---|---|
| 4,017,168 | 4/1977 | Brown | 352/243 |
| 4,156,512 | 5/1979 | Brown | 248/586 |
| 4,208,028 | 6/1980 | Brown | 352/243 |
| 4,474,439 | 10/1984 | Brown | 352/243 |
| 5,005,030 | 4/1991 | Wells | 352/243 |
| 5,243,370 | 9/1993 | Slater | 352/243 |
| 5,579,071 | 11/1996 | Wetzel et al. | 396/428 |

*Primary Examiner*—A. A. Mathews
*Attorney, Agent, or Firm*—Lyon & Lyon LLP

[57] ABSTRACT

A mounting system for supporting body mounted camera equipment. A three-axis gimbal supports a tube assembly which has provision for mounting a camera at the upper end thereof, a video monitor near the bottom and modular equipment associated with the lower end. The structural tube assembly has radially extending flanges to be received by a clamp which interlocks with the flanges and then may be tightened about the lower portion of the tube assembly. An electrical connection is also made at the lower end of the tube assembly. The modular equipment includes a junction box. A battery hanger or a universal gyro mount are disclosed in association with the lower junction box. The universal gyro mount includes a telescoping tube structure providing attachment flanges at either end as well as intermediate ends for flywheels. Many degrees of freedom are available for the mount position and extent as well as for the orientation of the flywheel units.

17 Claims, 12 Drawing Sheets

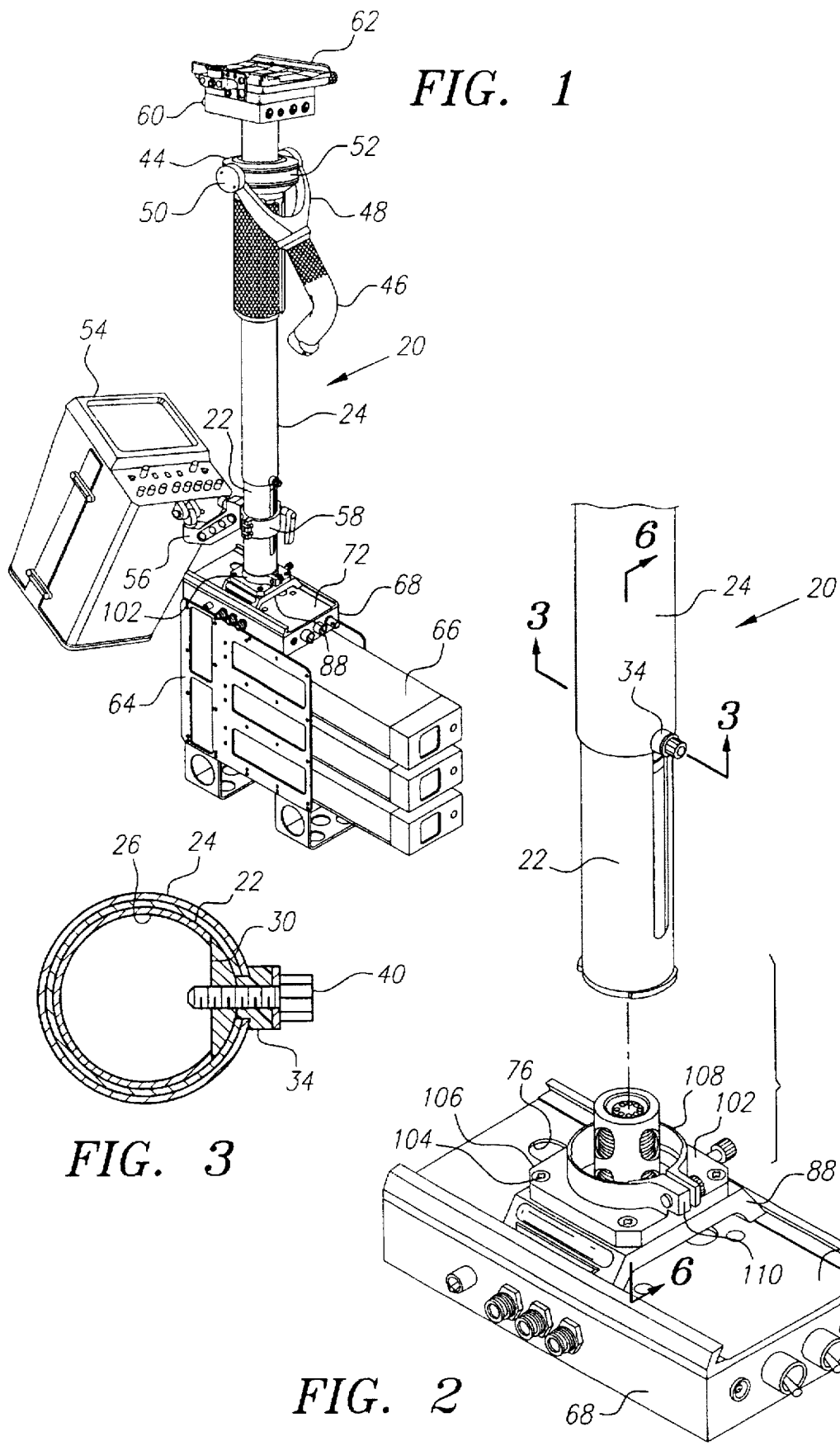

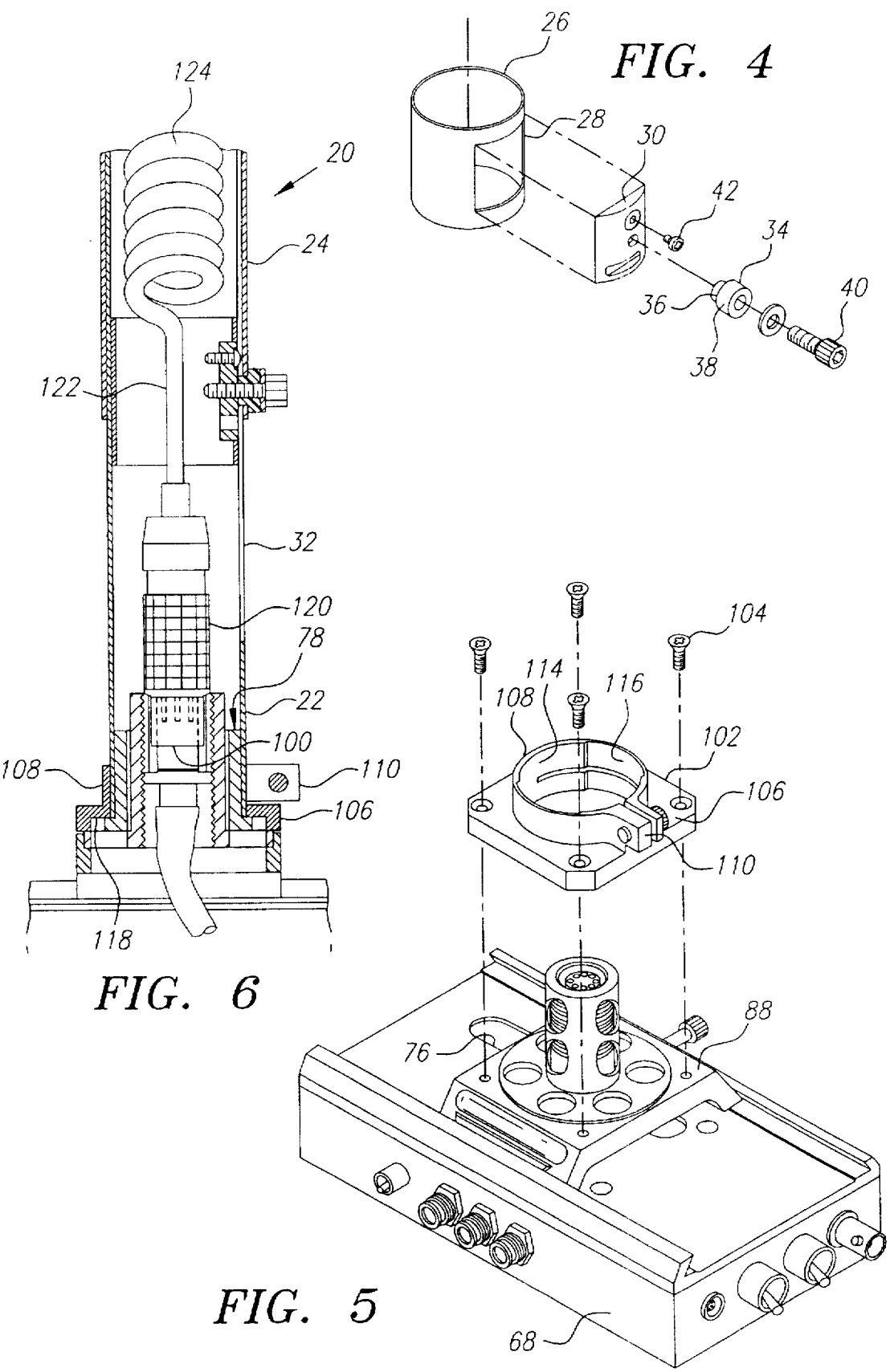

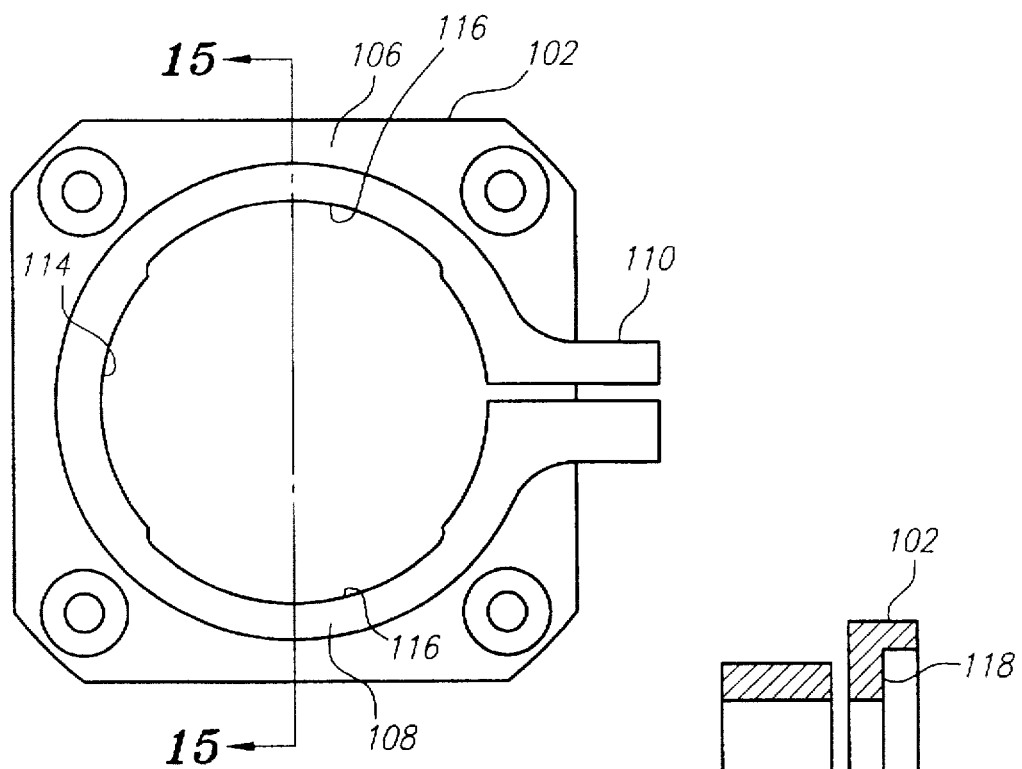
FIG. 13
FIG. 15
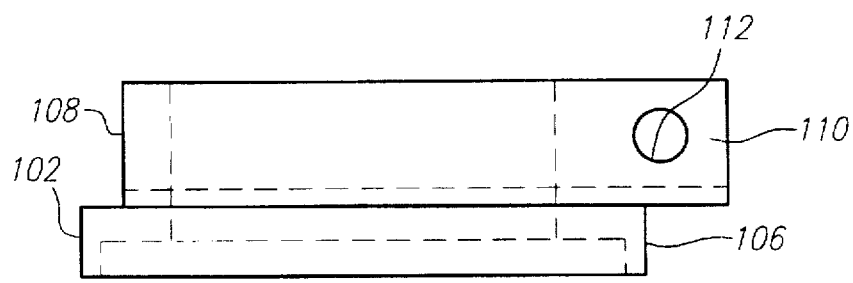
FIG. 14

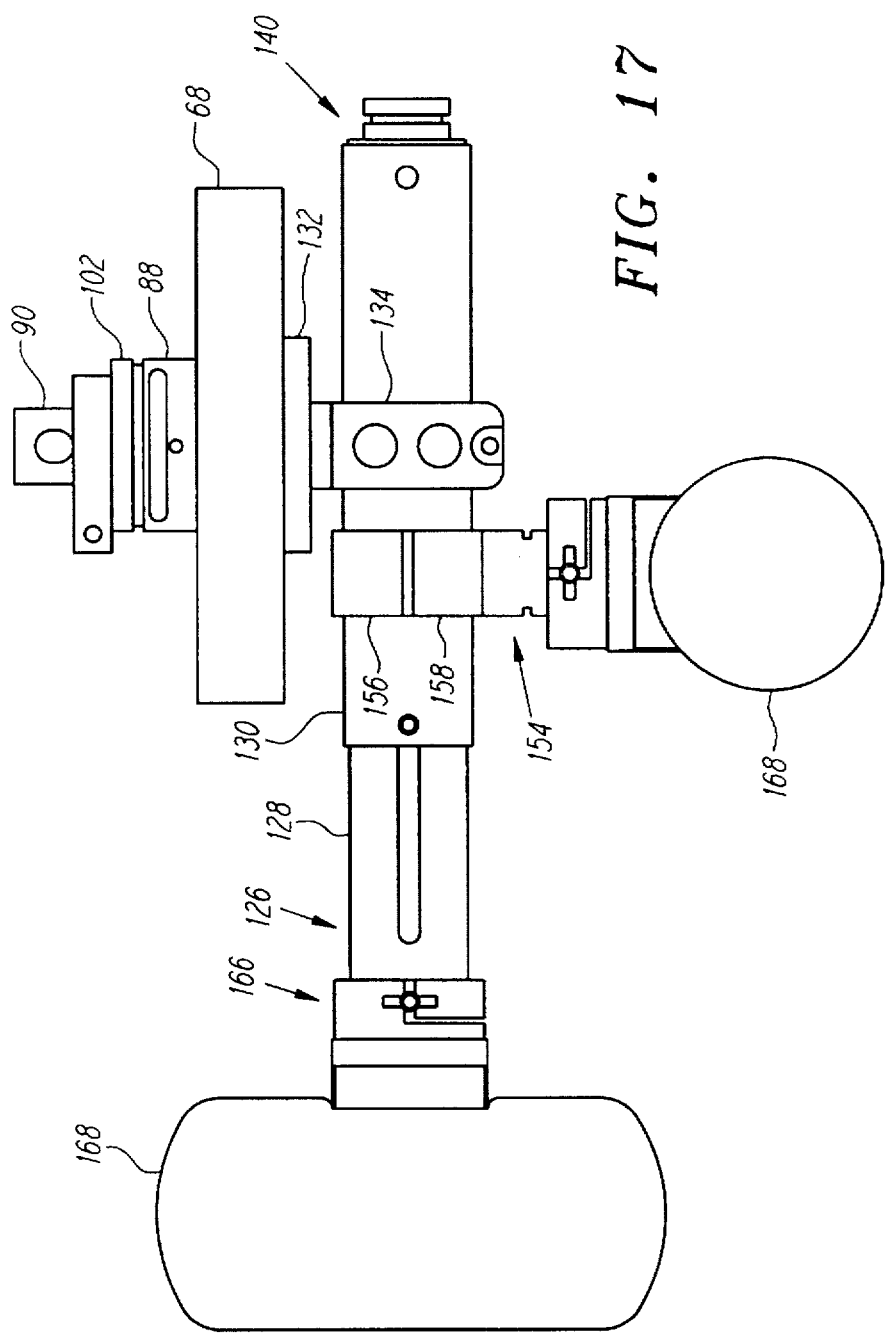

MOUNTING SYSTEM FOR BODY MOUNTED CAMERA EQUIPMENT

BACKGROUND OF THE INVENTION

The field of the present invention is structural hardware employed with body mounted camera equipment.

Body mounted cameras have been available for some time. Such cameras frequently are too heavy to be hand-carried or require a more stable platform. Where only weight is a factor, shoulder supported cameras have been used. Where stability is needed, mounting with resilient linkage to the operator's body is preferred. An early such body mounted camera support system is illustrated in U.S. Pat. No. 4,156,512, the disclosure of which is incorporated herein by reference.

Portable camera systems as employed for motion picture filming and the like typically include a fairly substantial camera, a large film magazine, batteries and a video monitoring system. With body mounted systems, a sprung mounting structure is typically employed to support all components. The components are frequently arranged to add stability to the sprung mass. Consequently, weight is shifted away from the support to increase angular inertia. The center of gravity is also carefully located to establish stability with the camera vertically oriented and without inducing excessive restoring forces.

In addition to the structural set-up for stability, flywheels have been employed to institute gyroscopic forces. Through the orientation of two such flywheels, impermissible motion in specific directions have been found to be significantly reduced. A variety of flywheel orientations have been empirically determined, depending upon the camera motions, both desired and unwanted.

The mountings of the various components of the camera system are required to be tight and secure to avoid adverse visual effects. Rigid mountings have been developed which satisfy those demands. However, a lack of flexibility in changing components has also been experienced.

SUMMARY OF THE INVENTION

The present invention is directed to a mounting system for elements associated with a body mounted camera.

In a first and separate aspect of the present invention, a mounting system employing a clamp is associated with the lower end of a mounting tube for providing a secure coupling for system components, and at the same time for providing a quick release. The structural tube of the body mounted camera equipment includes flanges extending outwardly. A mounting plate includes a bore with shoulders to receive the end of the tube with the flanges. Through rotation of the mounting relative to the tube, a shoulder can be engaged by a flange for support of the mounting and all equipment affixed thereto. A split clamp ring is associated with the mounting and receives the tube. The clamp ring can be tightened to fix the entire assembly in place.

In a second and separate aspect of the present invention, the clamp of the first aspect may be associated with a connector sleeve positioned within the mounting, a first connector positioned within the sleeve and a second connector associated with the structural tube to provide electrical communication between elements of the system.

In a third and separate aspect of the present invention, the mounting system of the first aspect further includes a tenon and mortise coupling between the clamp and an associated junction box. This system accommodates adjustments in component positioning to establish a desired system center of gravity.

In a fourth and separate aspect of the present invention, the mounting system of the first aspect might further include a universal gyro mount having multiple flywheel mounts for added system stability.

In a fifth and separate aspect of the present invention, a mounting system for body mounted camera equipment includes a universal gyro mount having an elongate element associated with the mounting. The elongate element includes two ends which may be displaced laterally from the mounting and have attachments for flywheels operated to induce gyroscopic forces. One or more additional mounts may be selectively oriented along the element with similar gyro attachments. The attachments provide for variable angular positioning of the flywheel gyros. The universal gyro mount provides the ability to position two or more gyros to stabilize desired camera movement for filming.

Accordingly, it is an object of the present invention to provide an improved body mounted camera mounting system. Other and further objects and advantages will become apparent from the following.

BRIEF DESCRIPTION OF THE DRAWINGS

FIG. 1 is a perspective view of a mounting system for body mounted camera equipment including a video monitor and a battery hanger.

FIG. 2 is a perspective view of the lower portion of the mount with the tube assembly disengaged.

FIG. 3 is a cross-sectional view taken along line 3—3 of FIG. 2.

FIG. 4 is an exploded perspective view of a tube assembly lock.

FIG. 5 is a perspective view of the lower mount with the clamp disassembled.

FIG. 6 is a cross-sectional elevation taken along line 6—6 of FIG. 2.

FIG. 13 is a plan view of the clamp.

FIG. 14 is a side view of the clamp.

FIG. 15 is a cross-sectional view taken along line 15—15 of FIG. 13.

FIG. 17 is a side view of an assembled universal gyro mount.

DETAILED DESCRIPTION OF THE PREFERRED EMBODIMENTS

Figure 7:
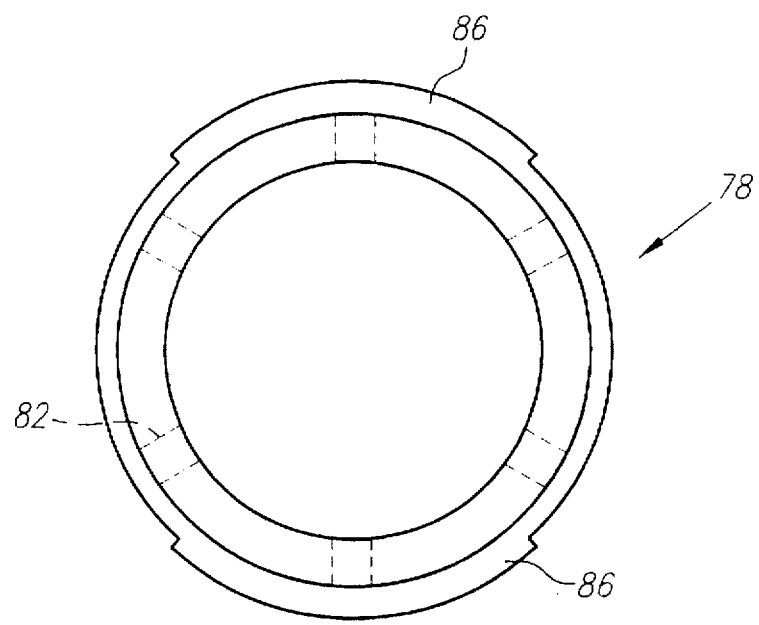
FIG. 7 is a top view of the inner collar associated with the tube assembly.

A mounting system for body mounted camera equipment is illustrated in the accompanying drawings. FIG. 1 illustrates a first set-up for such equipment. The assembly is to be coupled with a series of links or arms which are mounted to the body of a cameraman by a harness. Reference is made to U.S. Pat. Nos. 4,017,168 and 4,208,028, the disclosures of which are incorporated herein by reference.

The mounting system includes a tube assembly, generally designated 20, having two telescoping tubes 22 and 24. The length of the tube assembly 20 may be varied through sliding of the smaller tube 22 within the larger tube 24. A tube locking mechanism fixes the length of the tube assembly as desired. This mechanism includes a clamp retainer 26 slidably received within the smaller tube 22. A locating window 28 in the clamp retainer 26 receives a post clamp 30. The smaller tube 22 includes a slot 32 which may be aligned with a hole through the lower end portion of the larger tube 24. A collar 34 includes a smaller section 36 which fits within the slot 32 and a larger section 38 which is larger than the hole in the tube 24. This collar 34 is retained in place by a bolt 40 extending into the post clamp 30. An alignment bolt 42 also threaded into the post clamp 30 is positioned within the slot 32. By tightening the bolt 40, the post clamp 30 and the larger section 38 of the collar 34 clamp the two tubes 22 and 24 together to retain their position.

Mounted to the tube assembly 20 is a three-axis gimbal 44. An arm 46 is rotatably mounted to a yoke 48. The yoke is pivotally mounted about trunnions 50 and the tube assembly 20 can rotate about its longitudinal axis within a collar 52. The free end of the arm 46 is adapted to be mounted to the distal end of an articulated arm which can in turn be mounted to a harness which can be worn by a cameraman.

A video monitor 54 is associated with the tube assembly 20 using a monitor bracket 56 held in place around the tube assembly 20 by a clamp ring 58.

A plate (not visible) is associated with an upper junction box 60 and an adjustable platform 62 to define an upper attachment. This mechanism is designed to receive, for example, a motion picture camera or video camera.

Figure 16:
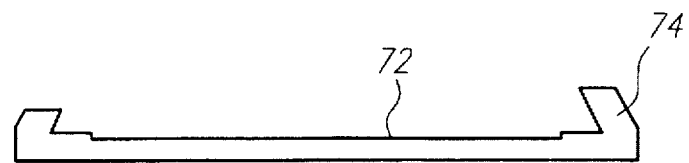
FIG. 16 is an end view of the junction box cover illustrating the mortise.

Associated with the bottom end of the tube assembly 20 is a battery hanger 64 including batteries 66. The battery hanger 64 is associated with a junction box 68. The junction box 68 provides a lower attachment defined by a lid 72 illustrated in end view in FIG. 16. The lid 72 includes a mortise defined by inwardly extending rails 74. The lid 72 is shown to include a slot 76 for receipt of cabling.

Figure 8:
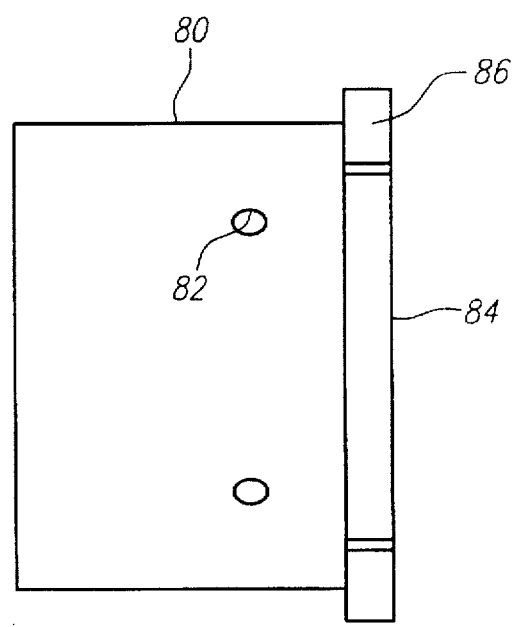
FIG. 8 is a side view of the collar of FIG. 7.

To mount the lower attachment to the tube assembly 20, an inner collar, generally designated 78, best seen in FIGS. 7 and 8 is associated with the smaller tube 22 at the lower end of the tube assembly 20. The inner collar 78 includes a cylindrical body 80 which has screw holes 82 for attachment to the tube 22. At one end of the cylinder body 80, a flange 84 extends outwardly to abut against one end of the tube 22. Enlarged diametrically opposed flanges 86 extend outwardly from the flange 84 to beyond the outer diameter of the smaller tube 22.

Figure 9:
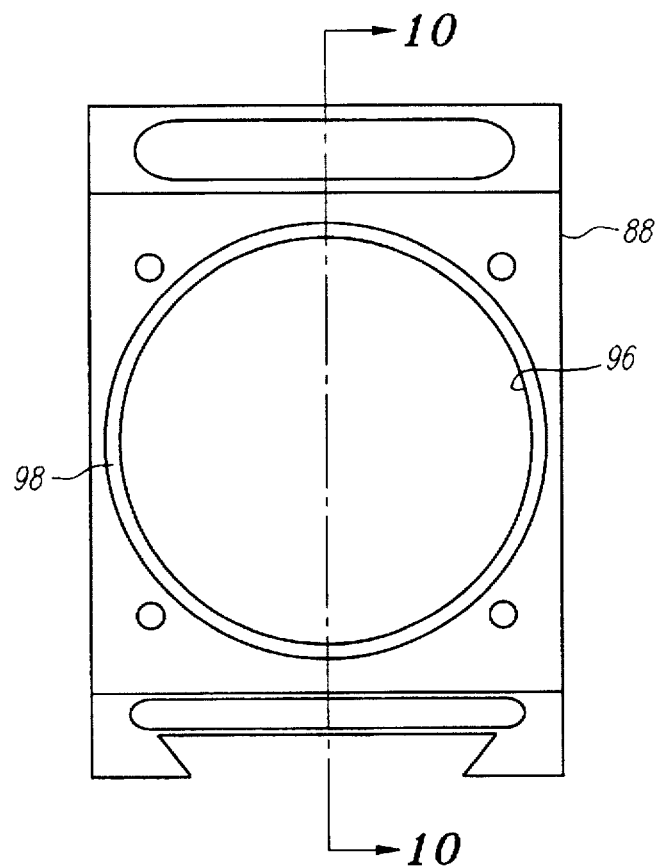
FIG. 9 is a plan view of the mounting.
Figure 10:
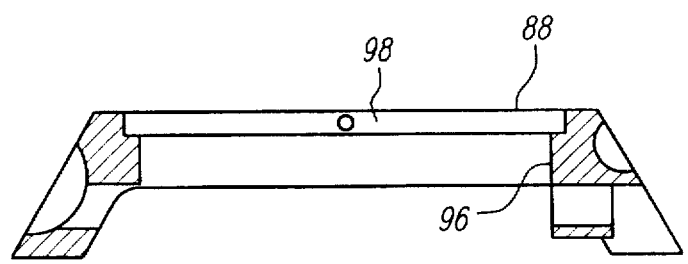
FIG. 10 is a cross-sectional side view taken along line 10—10 of FIG. 9.

A mounting 88 is illustrated in FIGS. 9 and 10. This mounting 88 defines a tenon by its sloped sides. The tenon fits within the mortise defined by the rails 74 and allows for adjustment of the junction box 68 relative to the mounting 88 for the achievement of a balanced system.

Figure 11:
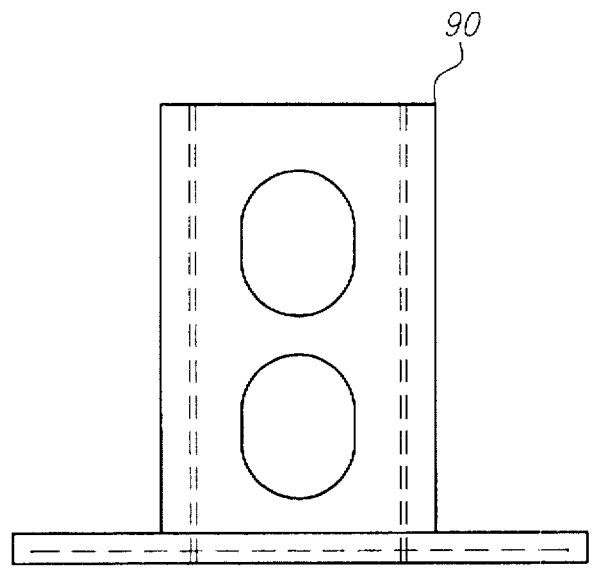
FIG. 11 is a side view of the connector sleeve.
Figure 12:
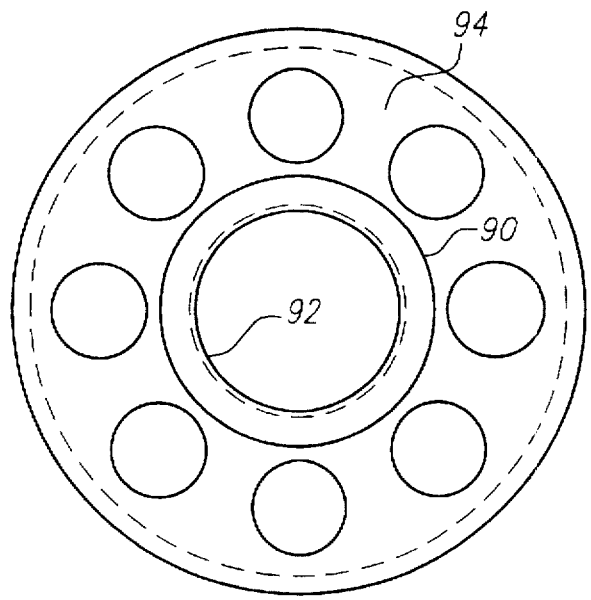
FIG. 12 is a plan view of the connector sleeve.

A connector sleeve 90 is illustrated in FIGS. 11 and 12. The connector sleeve 90 includes a threaded inner bore 92. A flange 94 is located at one end of the connector sleeve 90. As seen in FIGS. 9 and 10, a hole 96 is centrally positioned on the mounting 88 with a recessed ring 98. The recessed ring 98 receives the flange 94. A connector 100, illustrated in FIG. 1, may be threadably retained within the bore 92 of the connector sleeve 90 with a flexible conductor extending into the junction box 68 through the slot 76.

A clamp 102 is mounted to the mounting 88 by fasteners 104. The clamp includes a mounting plate 106 to accommodate the fasteners 104. The plate 106 also is positioned over the outer portion of the flange 94 to retain the connector sleeve 90 in position.

A compressible split clamp ring 108 is integrally formed atop the mounting plate 106. The ring 108 is cut away from the mounting plate 106 about one half of its extent. Consequently, the ring acquires compressible properties. To control the compression of the ring 108, tabs 110 are provided to either side of the split in the ring 108. A hole 112 in each tab accommodates a fastener for forcefully drawing the ring closer together. A bore 114 extends through the clamp ring 108 and mounting plate 106. This bore 114 includes longitudinally extending grooves 116 sized to accommodate the flanges 68. The remainder of the bore 114 is sized to accommodate the flange 84 and the associated smaller tube 22. Thus, the lower end of the tube assembly 20 can be inserted into the clamp 102. The mounting plate 106 has an inner shoulder 118 at the lower end of the bore 114. By fitting the lower end of the tube assembly 20 down into the bore 114, the flanges 86 will drop below the inner shoulder 118. The tube assembly 20 can then be rotated to interlock the flanges 86 with the inner shoulder 118 and the mounting plate 106. Once in this position, the clamp ring 108 may be tightened to securely retain the tube assembly 20 from rotating so that the flanges 68 will not disengage from the inner shoulder 118.

Coupled with the connector 100 is a second connector 120. This second connector 120 includes an extendable cable 122 having coils 124. The extendibility of the cable 122 allows the connectors 100 and 120 to be mated prior to the positioning of the lower end of the tube assembly 20 into the clamp 102. The fully assembled junction is illustrated in FIG. 6.

The foregoing mechanism for assembling the tube assembly 20 with the lower attachment provides a secured relationship between the components, adequate support for the battery hanger 64, and a modular arrangement for rapid interchanging of equipment.

Turning to FIGS. 17 through 25, a universal gyro mount is disclosed. This system may be employed in the position occupied by the battery hanger 64 in the system configuration discussed above. Configurations for multiple such systems to be hung on the same mounting system can be devised. However, it is understood to be advantageous to use a backpack or belt arrangement for batteries when employing a gyro mounting system.

The mount includes an elongate element, generally designated 126. This elongate element 126 is conveniently made of two tubes 128 and 130 telescoped together. A mechanism similar to that of the main tube assembly may be used in locking the tubes 128 and 130 together. Thus, a first degree of freedom is provided with the system through the extension or retraction of the elongate element assembly 126.

This elongate element 126 is supported on the underside of a junction box, such as the junction box 68 described in the aforementioned configuration mounting a battery hanger 64. An adaptor plate 132 is shown associated with the underside junction box 68. This adaptor plate 132 provides threaded holes for receipt of the universal gyro mount. The plate exhibits sufficient symmetry such that the universal gyro mount may be oriented in the plane of a camera attached to the adjustable platform 62 or normal to that plane.

Figure 18:
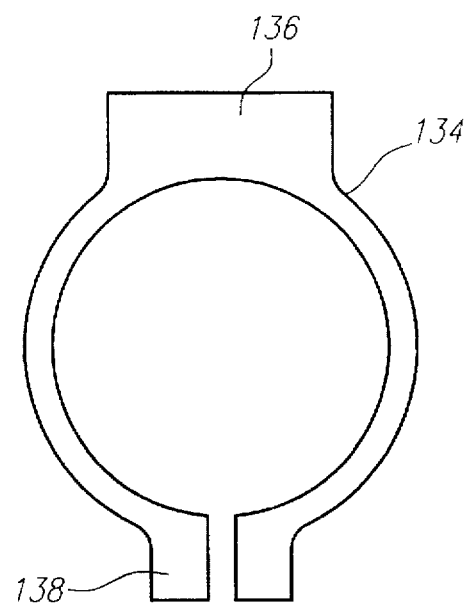
FIG. 18 is a side view of a junction box mounting for the universal gyro mount.
Figure 19:
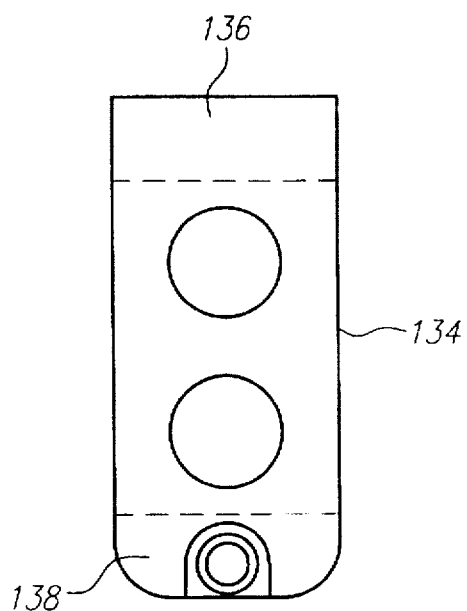
FIG. 19 is a front view of the mount of FIG. 18.
Figure 21:
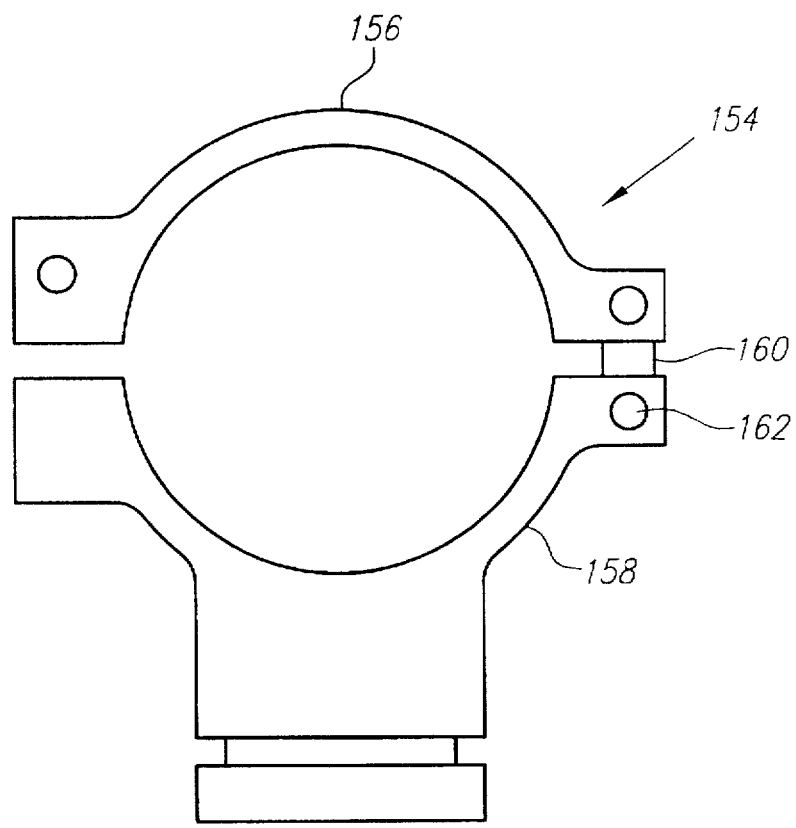
FIG. 21 is a side view of a clamp ring mount to go on the universal gyro mount.
Figure 22:
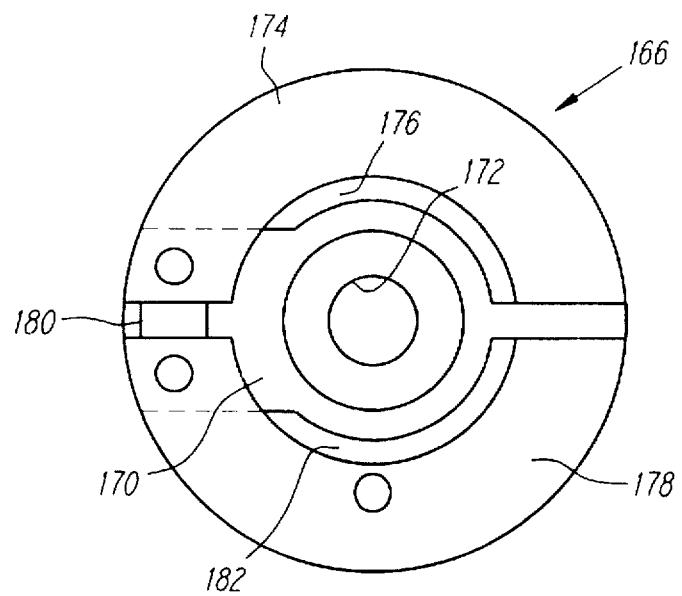
FIG. 22 is a side view of a flange clamp.
Figure 23:
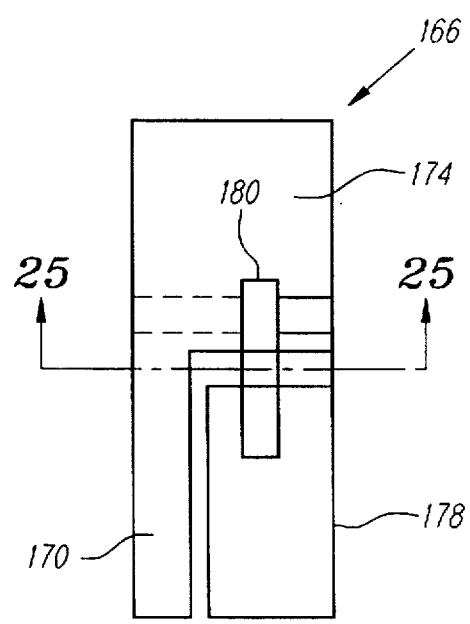
FIG. 23 is a first end view of the flange clamp.
Figure 24:
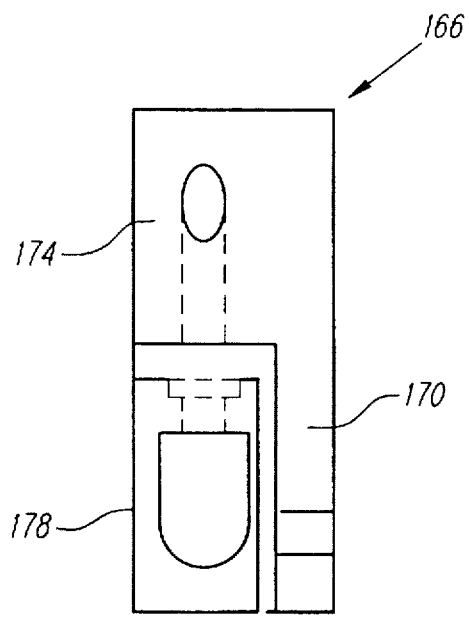
FIG. 24 is the opposite end view from FIG. 24 of the flange clamp.
Figure 25:
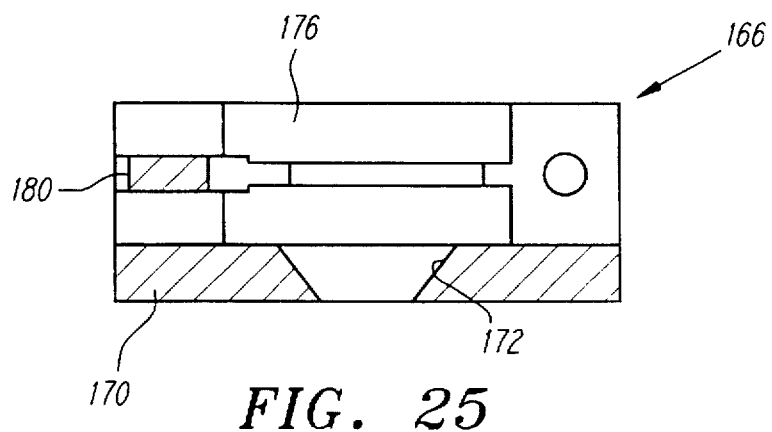
FIG. 25 is a cross-sectional view taken along line 25—25 of FIG. 23.

FIGS. 18 and 19 illustrate a junction box mount 134 which attaches to the adaptor plate 132. The mount 134 is principally a clamp ring with a boss 136 having holes to mate with the adaptor plate 132 through the use of fasteners. The clamp ring 134 is split with tabs 138 to allow constriction of the ring for clamping onto the elongate element 126. A further degree of freedom is provided in that the elongate element 126 may be moved longitudinally through a releasing of the clamp ring 134.

Figure 20:
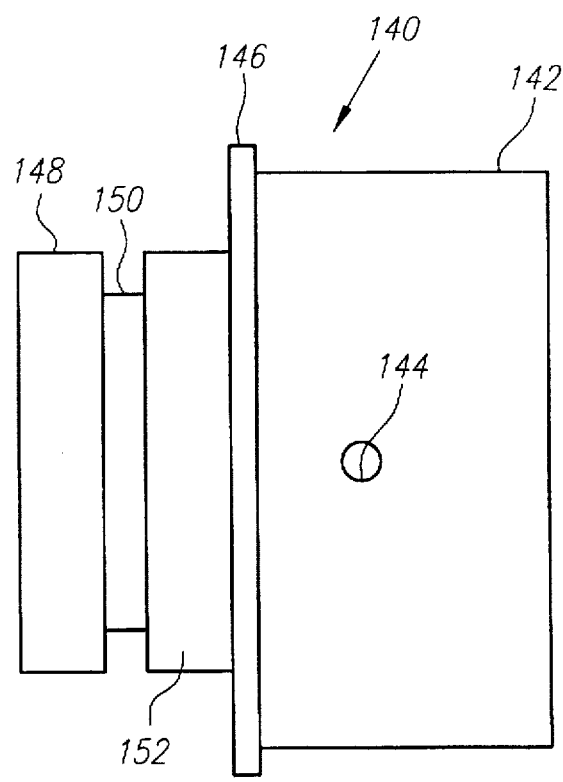
FIG. 20 is a side view of a mounting flange associated with the universal gyro mount.

FIG. 20 illustrates one mounting flange, generally designated 140. This mounting flange 140 is typical of three or more mounting flanges defining gyro attachments on the universal gyro mount. The mounting flange 140 includes a cylindrical body 142 which is associated with one or the other of the tubes 128 and 130 of the elongate element 126. Taps 144 extend through the body 142 for attachment to the tubes 128 and 130. An outwardly extending flange 146 is designed to abut against the ends of the tubes 128 and 130. An attachment flange 148 is defined at the outer ring of the mounting flange 140 by the presence of an annular channel 150 in a smaller cylindrical body portion 152.

One of the mounting flanges 140 is associated with the universal gyro mount through a clamp ring mount, generally designated 154. The clamp ring mount 154 includes a first segment 156 and a second segment 158 which together define an enclosing circular gripping surface for location on the elongate element 126. At one interface between the segments 156 and 158, two pivotally mounted links 160 are joined to the segments by pins 162. The other interface between the segments includes a swing-lock closure to draw the mount 154 into solid engagement with the elongate element 126. The second segment 158 includes an integrally mounting flange 140 having an identical attachment 148 defined by a channel 150 as is true of the mounting flange 140.

Flange clamps, generally designated 166, are attachable to the attachment flanges 148. The flange clamps 166 are illustrated in FIGS. 22 through 25. These clamps 166 are fixed to rotatable flywheels 168 which contribute the gyroscopic response for stabilizing the mounting system. Each flange clamp 166 includes a mounting plate 170. The mounting plate 170 includes a counter-sunk through hole 172 to receive a fastener for attachment to the flywheel 168. A first enclosure segment 174 is integrally formed with the mounting plate 170. This segment includes an attachment channel 176 having a profiled cross-section to mate with the attachment flange 148, the channel 150 and the small cylindrical body 152 of the mounting flange 140. A second enclosure segment 178 opposes the first enclosure segment 174. This segment 178 is attached to the first segment 174 by means of a pivotally mounted link 180 and a fastener. The second segment 178 includes an attachment channel 182 complimentary to the attachment channel 176 so as to surround and retain the attachment flange 148 of the mounting flange 140.

The universal gyro mount provides three or more attachments for flywheels which operate to provide a gyroscopic response to stabilization. Two such flywheels 168 may be associated with the ends of the elongate element 126. Other available attachment points include the full length of the elongate element 126 by means of one or more clamp ring mounting elements 154. The length of the elongate element 126 can also be varied. The orientation of the elongate element 126 as either aligned with the plane of the camera or normal thereto provides a further degree of freedom. Finally, the flange clamps 166 may be loosened to permit rotation of the attached flywheel housings for desired orientation of the axis of the flywheels 168. By virtue of the clamp 102, the universal gyro mount may operate on a modular basis for attachment and detachment from the line system.

Accordingly, an improved mounting system for body mounted camera equipment is disclosed which provides modular convenience and system stability. Although embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A mounting system for body mounted camera equipment, comprising
    a tube assembly including a tube having a first, upper end and a second, lower end, the second, lower end having flanges extending radially outwardly from the tube;
    a first attachment on the first, upper end of the tube assembly;
    a second attachment;
    a clamp including a mounting fixed to the second attachment, a split clamp ring fixed to the mounting, a bore through the split clamp ring and the mounting, grooves in the split clamp ring and the mounting extending longitudinally about the periphery of the bore and sized to axially receive the flanges, the mounting having a shoulder adjacent the grooves to receive and inter-engage the flanges through placement and rotation of the second, lower end of the tube assembly in the clamp, the split clamp ring being axially compressible against the second, lower end.

2. The mounting system of claim 1 further comprising
    a connector sleeve positioned on the mounting and extending upwardly in the bore;
    a first connector positioned in the connector sleeve;
    an extendable cable extending from the first attachment through the tube assembly and having a second connector slidably positioned at the second, lower end of the tube assembly to mate with the first connector.

3. The mounting system of claim 1, the second, lower end of the tube assembly including an inner collar fixed to the tube, the inner collar having the flanges.

4. The mounting system of claim 1, the flanges and grooves being two each, oppositely disposed on the tube assembly and the clamp, respectively.

5. The mounting system of claim 1, the compressible split clamp ring having two tabs to either side of the split, respectively, one half of the clamp ring from one tab being fixed to the mounting and the other half of the clamp ring from the other tab being separate from the mounting.

6. The mounting system of claim 5, the tabs including holes, the compressible split clamp ring further having a fastener associated with the holes to compress the split clamp ring.

7. The mounting system of claim 1, the second attachment including a tenon.

8. The mounting system of claim 7 further comprising
a junction box including a mortise, the tenon being slidable in the mortise.

9. The mounting system of claim 8 further comprising a battery hanger fixed to the junction box.

10. The mounting system of claim 8 further comprising a universal gyro mount fixed to the junction box.

11. The mounting system of claim 1 further comprising a universal gyro mount supported by the second attachment.

12. The mounting system of claim 11, the universal gyro mount including an elongate element and three gyro attachments each having an axis, a first and a second of the gyro attachments being at either end of the elongate element with the axes aligned, the third of the gyro attachments including an attachment clamp on the elongate element with the axis of the attachment being perpendicular to the axes of the first and second of the gyro attachments.

13. The mounting system of claim 12, the elongate element including two attachment tubes slidably telescoped together.

14. The mounting system of claim 12, the universal gyro mount further including gyro clamps, each having a first annular channel and a second annular channel adjacent the first annular channel, the gyro attachments each including an annular flange mating with a first annular clamp, respectively.

15. A mounting system for body mounted camera equipment, comprising a tube assembly including a tube having a first, upper end and a second, lower end, the second, lower end having flanges extending radially outwardly from the tube;

a first attachment on the first, upper end of the tube assembly;

a second attachment on the second, lower end of the tube assembly;

a universal gyro mount supported by the second attachment the universal gyro mount including an elongate element and three gyro attachments each having an axis, a first and a second of the gyro attachments being at either end of the elongate element with the axes aligned, the third of the gyro attachments including an attachment clamp on the elongate element with the axis of the attachment being perpendicular to the axes of the first and second of the gyro attachments.

16. The mounting system of claim 15, the elongate element including two attachment tubes slidably telescoped together.

17. The mounting system of claim 15, the universal gyro mount further including gyro clamps, each having a first annular channel and a second annular channel adjacent the first annular channel, the gyro attachments each including an annular flange mating with a first annular clamp, respectively.

* * * * *